US009050767B2

(12) United States Patent
Hansen

(10) Patent No.: US 9,050,767 B2
(45) Date of Patent: Jun. 9, 2015

(54) APPARATUS FOR PRODUCING AT LEAST ONE CONTAINER, IN PARTICULAR IN AMPULE FORM, MADE OF THERMOPLASTIC MATERIAL

(76) Inventor: Bernd Hansen, Sulzbach-Laufen (DE)

( * ) Notice: Subject to any disclaimer, the term of this patent is extended or adjusted under 35 U.S.C. 154(b) by 11 days.

(21) Appl. No.: 13/261,626

(22) PCT Filed: Nov. 10, 2011

(86) PCT No.: PCT/EP2011/005654
§ 371 (c)(1),
(2), (4) Date: Mar. 28, 2013

(87) PCT Pub. No.: WO2012/072182
PCT Pub. Date: Jun. 7, 2012

(65) Prior Publication Data
US 2013/0189388 A1  Jul. 25, 2013

(30) Foreign Application Priority Data
Dec. 3, 2010  (DE) .......................... 10 2010 053 285

(51) Int. Cl.
*B29C 49/76* (2006.01)
*B29D 22/00* (2006.01)
(Continued)

(52) U.S. Cl.
CPC ........... *B29D 22/003* (2013.01); *B29C 49/4236* (2013.01); *B29C 49/4273* (2013.01); *B29C 49/76* (2013.01); *B29C 2049/4869* (2013.01); *B29C 2049/503* (2013.01); *B29C 2049/701* (2013.01);
(Continued)

(58) Field of Classification Search
CPC ............................ B29C 49/4236; B29C 49/76
USPC ........................................................ 425/218
See application file for complete search history.

(56) References Cited

U.S. PATENT DOCUMENTS 3,162,706 A    12/1964  Cheney
3,782,877 A *  1/1974   Mehnert ........................ 425/531
4,126,658 A *  11/1978  Rupert et al. .................. 264/533
(Continued)

FOREIGN PATENT DOCUMENTS

DE      30 05 931 A1    8/1981
EP      0 428 394 A2    5/1991
(Continued)

*Primary Examiner* — Alison Hindenlang
(74) *Attorney, Agent, or Firm* — Roylance, Abrams, Berdo and Goodman LLP

(57) ABSTRACT

An apparatus for producing at least one container, in particular in ampoule form, made of thermoplastic material, includes a mold (13) with mold components (15, 17). A first calibrating mandrel (19) and a second calibrating mandrel (23) are movable coaxially in relation to the longitudinal direction (21) of the container (1) and in relation to one another. The first calibrating mandrel (19) through the container (1) located in the mold (13) and the second calibrating mandrel (23) from the outer side of the container (1), move into a shaping position in which they calibrate a bottom area that forms at least part of a container bottom between the mandrel ends. A severing device has a movable cutting or punching surface (37) to sever excess plastic material forming during the shaping process in interaction with a cutting or bearing edge on the mold components (17) assigned to the bottom region. The severing device has a cutting device (35) that is guided in an axially displaceable manner on the second calibrating mandrel (23), forms the cutting or punching surface (37) and can move between the withdrawn position and the punching position independently of the movement of the respective calibrating mandrel (23).

18 Claims, 3 Drawing Sheets

(51) Int. Cl.
*B29C 49/42* (2006.01)
*B29C 49/48* (2006.01)
*B29C 49/50* (2006.01)
*B29C 49/70* (2006.01)
*B29L 31/00* (2006.01)

(52) U.S. Cl.
CPC ..... *B29C 2791/006* (2013.01); *B29C 2791/007* (2013.01); *B29C 2793/0027* (2013.01); *B29C 2793/009* (2013.01); *B29L 2031/7158* (2013.01)

(56) References Cited

U.S. PATENT DOCUMENTS 5,215,694 A * 6/1993 Bartimes et al. ............... 264/68
5,399,302 A * 3/1995 Noguchi et al. ............. 264/412

FOREIGN PATENT DOCUMENTS

| GB | 2 066 210 A | 7/1981 |
| GB | 2 069 455 A | 8/1981 |
| JP | 60 214924 A | 10/1985 |

* cited by examiner

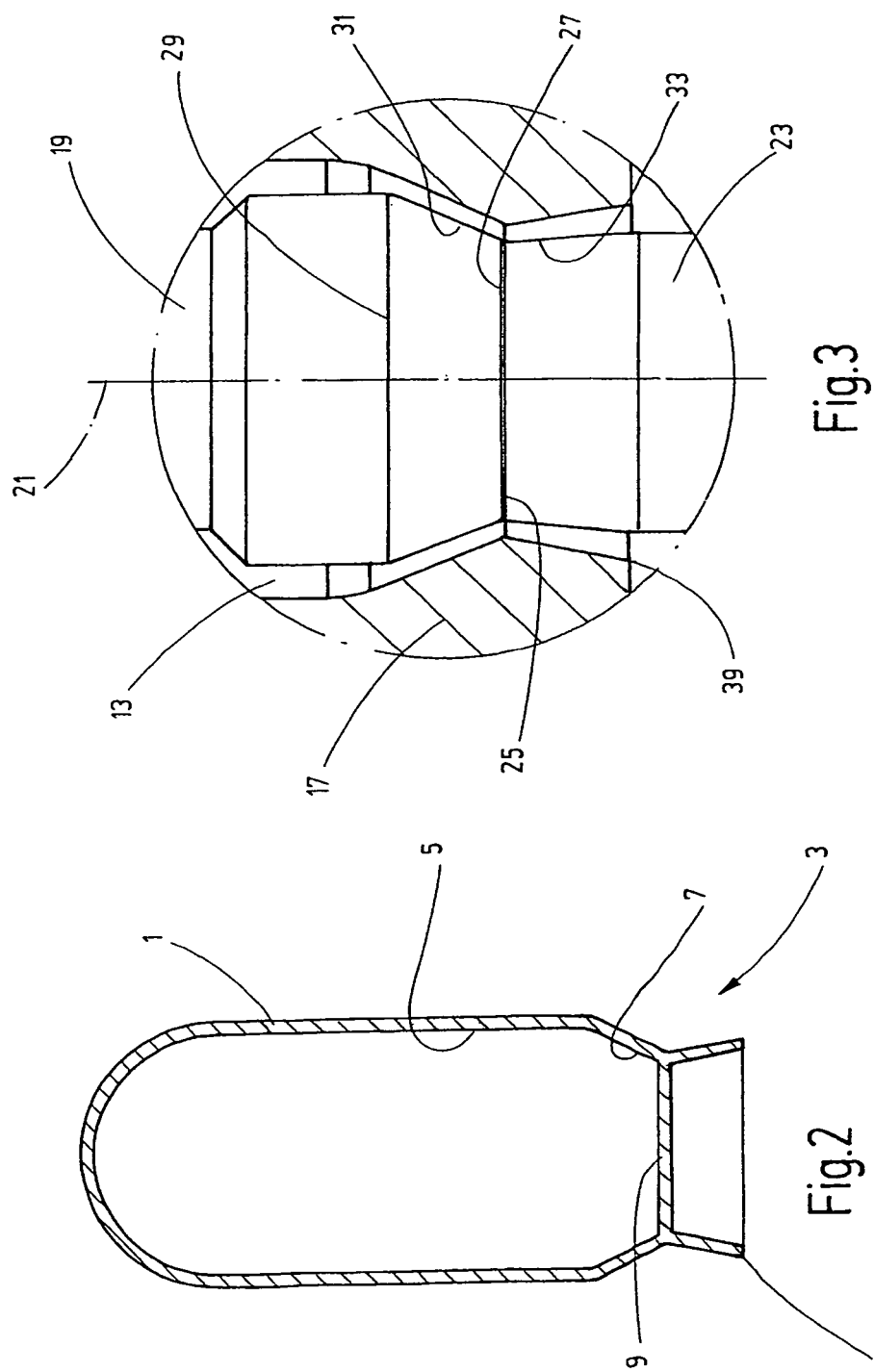

APPARATUS FOR PRODUCING AT LEAST ONE CONTAINER, IN PARTICULAR IN AMPULE FORM, MADE OF THERMOPLASTIC MATERIAL

FIELD OF THE INVENTION

The invention relates to an apparatus for producing at least one container, in particular in ampule form, made of a thermoplastic material. The apparatus comprises a mold with mold components that can be moved between an open position and a closed position in relation to one another. A synthetic plastic material can be placed against the walls in the mold by a pressure gradient, which pressure gradient acts on the plastic material to form the container. First and second calibrating mandrels can be moved coaxially in relation to the longitudinal direction of the container and to one another. The first calibrating mandrel can move through the container located in the mold. The second calibrating mandrel can move from the outside of the container into a shaping position in which those mandrels calibrate a bottom area forming at least part of a container bottom between their mandrel ends. A severing device has a movable cutting or punching surface to sever excess plastic material that forms in interaction with a cutting or contact edge on the mold components assigned to the bottom region during the shaping process.

BACKGROUND OF THE INVENTION

To produce different types of plastic containers, in particular also containers that resemble ampules for pharmaceuticals, reagents, or the like, in an efficient and economical manner, the prior art uses to advantage apparatus that work according to the well-known Bottelpack® process.

These apparatus enable the desired container shape to be expanded from the plastic material extruded into a mold by blow molding or by vacuum molding. If desired, the container can be filled in the mold. Since no handling outside the mold is necessary between the molding process of the container and its filling, the requirements for cleanliness and/or sterilization of the filling can be reliably fulfilled.

When the finished containers are used at a later date, for example, in the field of pharmaceuticals and medicine, the filling is usually extracted through the bottom of the container, for example, by inserting a canula or by tearing open a bottom area. To ensure a fail-safe extraction of the container content, the prior art performs a calibration at the bottom area relevant for the extraction process. Document DE 30 05 931 A1 discloses an apparatus of the type described in the foregoing. For this purpose, the prior art apparatus has movable calibrating mandrels that can be moved coaxially in relation to one another from both sides of the container bottom of the container and that is located in the mold. In a shaping position, the mandrels calibrate the bottom area between their mandrel ends in such a way that a bottom-side wall region of defined shape and wall thickness is formed as a diaphragm. The excess plastic material, produced during the shaping process, is severed from the mold components, assigned to the bottom region, by a severing device, provided in the prior art apparatus to end the production process of the bottom region.

SUMMARY OF THE INVENTION

An object of the present invention is to provide an improved apparatus in which higher accuracy and process reliability with respect to the calibrating and severing can be achieved in a simple and easy way.

The invention basically achieves this object by an apparatus having a severing device with a cutting device. The cutting device is guided in an axially displaceable manner on the second calibrating mandrel, forms the cutting or punching surface, and can move between the retracted position and the punching position independently of the movement of the respective calibrating mandrel. In the aforementioned prior art solution, the second calibrating mandrel forms both the calibrating surface on the end of the mandrel and forms the punching surface of the severing device with a step, which step is set back from the end of the mandrel, at the transition to a larger diameter of the mandrel, in this invention, the calibrating and severing functions are completely decoupled from one another. This decoupling means that the lifting motion of the mandrel for the calibrating process can be configured and controlled in such a way that the closing position is reached at exactly the point that is optimal for the position and wall thickness of the bottom area to be calibrated, in contrast to the invention, the prior art solution makes the movement of the calibrating mandrel a function of a percussion movement that is suitable for the punching process, so that, if suitably fine tolerances can be maintained, it can be guaranteed that this punching movement will bring the mandrel end into the closing position that is optimal for the calibrating process. In contrast to this prior art solution, the present invention provides that the punching movement takes place, independently of the calibrating process, with the percussion movement that is optimal for the severing process.

In this context, the cutting device can comprise in an especially advantageous way a cutting sleeve guided in a displaceable manner on the second calibrating mandrel and having a front edge on which the cutting or punching surface is formed. Despite the advantageous decoupling of the punching and calibrating process, the result is a simple compact design, because, like the solution known from the prior art, the calibrating mandrel and the cutting device are combined into one structural unit that in the case of the present invention has two coaxial elements that can be moved relative to one another.

In advantageous exemplary embodiments, the first calibrating mandrel can have on the mandrel end a molded body with an end surface for the purpose of calibrating the bottom area. A conical part is connected to the end surface and widens away from the end surface to form a bottom cup of the container. This bottom cup is adjacent to the bottom area. In addition to its calibrating function, the first calibrating mandrel acts as a movable mold component that imparts to the container a cup shape adjacent to the container bottom.

The second calibrating mandrel can have in an especially advantageous way a conical part on the mandrel end. This conical part is connected to that end surface of the calibrating mandrel that calibrates the bottom area, and widens away from the end surface to form an outward widening dispensing spout that has a shape resembling a shirt.

In view of actuating the second calibrating mandrel, the arrangement can be configured to advantage so that separately actuatable drive devices are provided to generate the back and forward movements of the second calibrating mandrel between the retracted position and the shaping position and to generate the movements of the cutting sleeve between the retracted position and the punching position.

Furthermore, two pairs of first and second calibrating mandrels that can be moved in parallel to one another can be provided for two containers that are to be formed by common mold components. Both second calibrating mandrels are mounted on a base body that can be moved by a mandrel drive.

In especially preferred exemplary embodiments, the second calibrating mandrels can penetrate a support plate, on which the respective cutting sleeves are mounted, and can be moved relative to the base body by a punch drive to move the cutting sleeves relative to the second calibrating mandrels between the retracted position and the punching position. This arrangement allows a punch drive that is common for both cutting sleeves to be implemented in a very easy way.

The punch drive can comprise to great advantage at least one working cylinder fitted between the base body and the support plate and actuated with a pressure medium to generate the relative movements between the base body and the support plate. As an alternative, an electric linear drive, for example, in the form of a spindle drive or the like, could be provided. The same applies to the mandrel drive that generates the movements of the base body.

In especially preferred exemplary embodiments, the support plate has at least one ejector pin that extends parallel to the respective cutting sleeve and that ejects the respective containers from the mold in the course of the severing process, i.e., during the punching movement extending in the direction of the bottom region of the mold.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a side elevational view in section of a container produced with the apparatus of FIG. 1 and having the shape of an ampule, with the container drawn about twice the size of a practical embodiment;

FIG. 3 is an enlarged side elevational view in section of the area designated as III in FIG. 1.

DETAILED DESCRIPTION OF THE INVENTION

Figure 1:
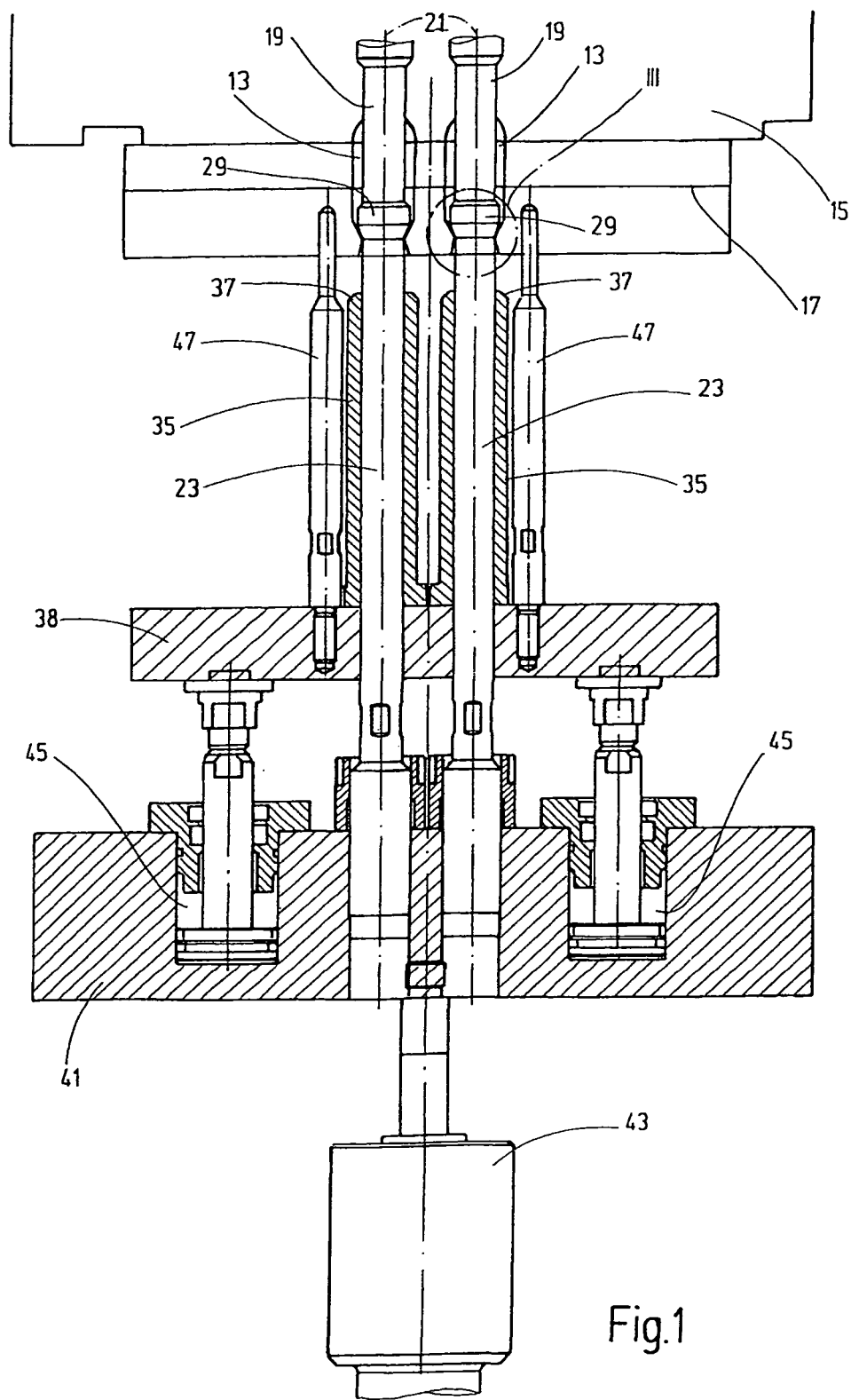
FIG. 1 is a side elevational view in section of an apparatus according to an exemplary embodiment of the invention in a simplified schematic form, wherein the calibrating mandrels are shown in the shaping position, and the cutting sleeves are shown in the retracted position.

The invention is explained below by one example, in which the apparatus is provided for producing containers in the form of an ampule, with one container 1 shown separately in FIG. 2. The container 1 shown in the closed state, but without the filling in FIG. 2, has a dispensing end 3 for subsequent use. At this dispensing end, the circularly cylindrical main part 5 of the container 1 undergoes transition into a bottom cup 7 defined by conical surfaces converging in the direction of the container bottom. A bottom area 9 forms the bottom-side closure of the container 1. In the present case, the bottom area 9 is designed as a diaphragm and is calibrated such that it forms a closure element that is optimal for the subsequent use of the container 1. Connected to the bottom area 9 is a dispensing spout 11 defined by diverging side walls.

FIG. 1 shows those parts of the apparatus for producing the container 1 necessary for understanding the invention. Since the apparatus is based on the well-known Bottelpack® system, only the movable mold components 15, 17 of the pertinent blow mold forming two mold cavities 13 are indicated as the main jaw and the head jaw. Mold cavities 13 lie side by side in a tandem arrangement, for the simultaneous production of two containers 1. The other components, such as the blowing mandrels, the filling mandrels, and the like, are not shown in FIG. 1, because they can be constructed according to the prior art. However, FIG. 1 shows very clearly in conjunction with FIGS. 3 and 4 those components that are relevant for forming the dispensing end 3 of the container 1 with the bottom cup 7, the calibrated bottom area 9, and the dispensing spout 11.

As shown in the prior art document (DE 30 05 931 A1), the apparatus has a pair of first calibrating mandrels 19 that can be moved coaxially to the longitudinal axis 21 corresponding to the longitudinal axis of the container 1 that is to be formed. The drive for the movements of the first calibrating mandrels 19, each of which may be found, as depicted in FIG. 1 as well as in FIGS. 3 and 4, in the shaping position, can be designed in the standard way according to the prior art. The first calibrating mandrels 19 extend through the mold cavities 13, i.e., through the interior of the respective container 1, so that, in the shaping position, these first calibrating mandrels can perform, in interaction with a pair of second calibrating mandrels 23, the calibration of the bottom area 9 of the container 1. The second calibrating mandrels 23 extend coaxially to the longitudinal axis 21 and to the first calibrating mandrels 19. The first and second calibrating mandrels 19 and 23 form a calibrating surface 25 and 27, respectively, on their adjacent ends. In the depicted exemplary embodiment, these two calibrating surfaces are flat surfaces, so that in the present case a bottom area 9 having the shape of a flat diaphragm can be calibrated.

To calibrate a curved or contoured bottom area, corresponding shapes of the calibrating surfaces 25, 27 could be provided. In the figures, in which none of the synthetic plastic material that may be found in the mold cavity 13, is shown for the sake of simplifying the drawings, the calibrating surfaces 25, 27 are shown as abutting one another. Under normal operating conditions, however, with the calibrating mandrels 25, 27 in the shaping position, a gap (not shown in the drawing) is present that corresponds to the wall thickness of the bottom area 9 that resembles a diaphragm.

The first calibrating mandrels 19 each have on the mandrel end a molded body 29 with an end surface that forms the calibrating surface 25 to which a conical part 31 is connected. This conical part widens away from the calibrating surface 25 to form the bottom cup 7 of the container 1, where the bottom cup is adjacent to the bottom area 9. Similarly, the respective second calibrating mandrel 23 has on the mandrel end thereof a conical part 33 that is connected to the calibrating surface 27 calibrating the bottom area 9 and that widens away from the calibrating surface 27 to form the outward widening, shirt-like dispensing spout 11 of the container 1.

Figure 4:
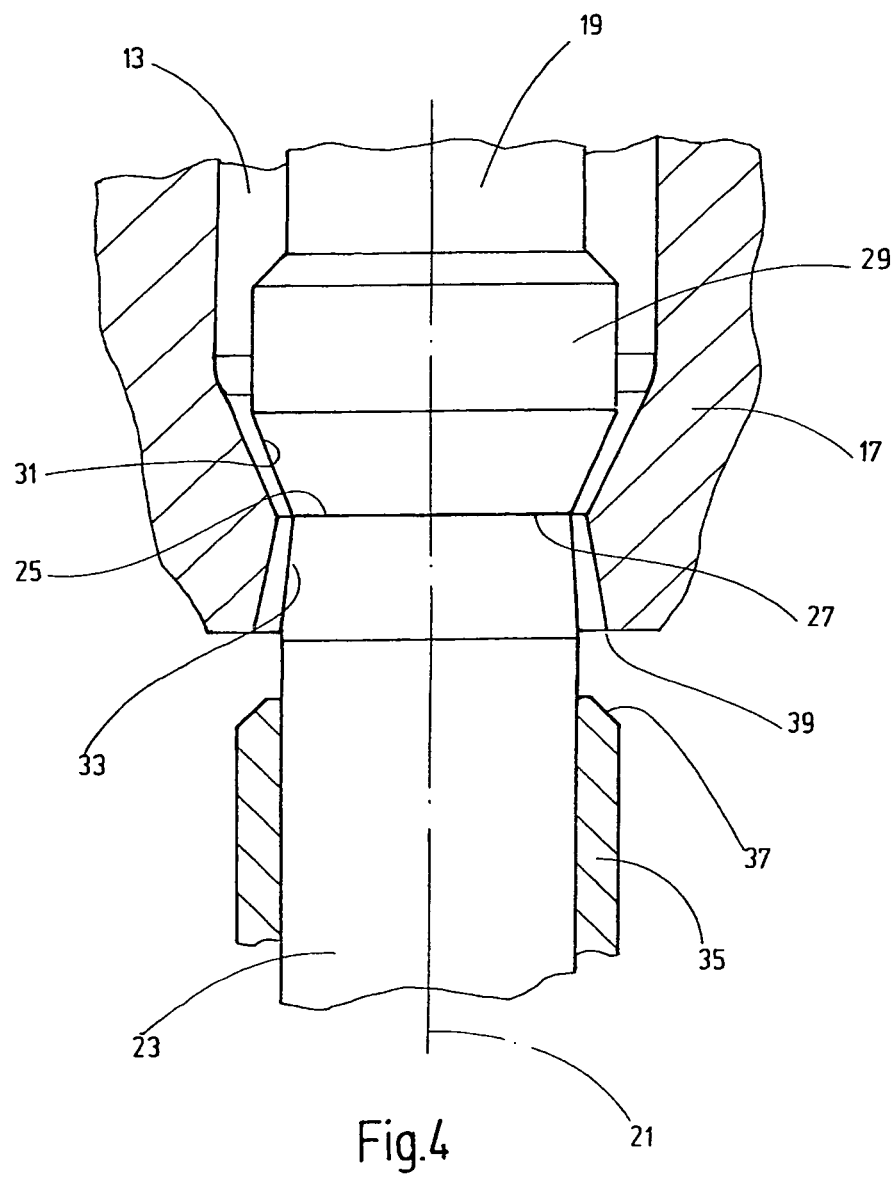
FIG. 4 is a partial side elevational view in section similar to FIG. 3, where a cutting sleeve is shown prior to reaching its punching position and where the punching surface of the cutting sleeve is still located at a distance from the assigned cutting edge.

The severing device of the apparatus is shown in greater detail in the FIGS. 1 and 4. A cutting sleeve 35 is guided with a sliding fit on each of the two calibrating mandrels 23. Each cutting sleeve can then be moved in the axial direction. As most easily discernible from FIG. 4, the front edge of the cutting sleeve 35 has an inclined surface 37 that interacts with a cutting or contact edge 39 as the punching surface. This cutting or contact edge is formed by the end edge of the outlet opening of the mold component 17. When in operation, the cutting sleeve 35 is moved out of the position shown in FIG. 4 on the second calibrating mandrel 23 into the punching position, i.e., upward in FIG. 4. Then the excess synthetic plastic material surrounding the end edge of the molded dispensing spout 11 is cut off.

FIG. 1 shows that both cutting sleeves 35 have ends that are opposite the inclined surface 37 and that are supported on a common support plate 38 pierced by the second calibrating mandrels 23. Support plate 38 can be moved relative to these calibrating mandrels. The second calibrating mandrels 23 are fastened on a base body 41 engaged by a linear drive 43. This linear drive forms the mandrel drive for the movements of the second calibrating mandrels 23. This drive 43 can be an electric, hydraulic, or pneumatic drive. Independently of the movements of the base body 41 and with it the calibrating mandrels 23, the support plate 38 and with it the cutting sleeves 35 can be moved relative to the second calibrating mandrels 23 by a punch drive. In the present exemplary embodiment, two working cylinders 45 are provided as the punch drive. On both sides of the calibrating mandrels 23, one of these two working cylinders is arranged between the base body 41 and the support plate 38. Both working cylinders can be hydraulically or pneumatically operated to generate the punching movement of the cutting sleeves 35. Instead of the working cylinders 45, other types of linear drives could also be used. Laterally next to each of the cutting sleeves 35, ejector pins 47 are mounted on the support plate 38. These ejector pins 47 extend parallel to the cutting sleeves and next to the cutting sleeves 35. The material that remains after the severing process, including the container 1, is ejected from the opened mold.

While one embodiment has been chosen to illustrate the invention, it will be understood by those skilled in the art that various changes and modifications can be made therein without departing from the scope of the invention as defined in the appended claims.

What is claimed is:

1. An apparatus for producing a container of thermoplastic material, comprising:
   a mold with mold components movable relative to one another between an open position and a closed position and in which synthetic plastic material can be placed against walls of said mold components by a pressure gradient to act on the plastic material and to form a container;
   first and second calibrating mandrels movable coaxially relative to a longitudinal axis of the container and to one another, said first calibrating mandrel being movable through the container located and formed in said mold components, said second calibrating mandrel being movable from outside the container located and formed in said mold components into a shaping position to calibrate a bottom area forming at least part of a container bottom of that container between adjacent mandrel ends of said first and second calibrating mandrels; and
   a severing device having a movable cutting surface severing excess plastic material, said cutting surface interacting with a cutting edge on a bottom portion of said mold components, said severing device having a cutting device guided on and axially displaceable on said second calibrating mandrel and forming said cutting surface, said cutting device being movable between a retracted position and a punching position independently of movement of said second calibrating mandrel, said caning surface being inclined at an acute angle relative to said longitudinal axis.

2. An apparatus according to claim 1 wherein
   said cutting device comprises a cutting sleeve guided for displacement on said calibrating mandrel and having said cutting surface on a front edge of said cutting device.

3. An apparatus according to claim 1 wherein
   said first calibrating mandrel comprises a molded body with an end surface on said mandrel end of said first calibrating mandrel for calibrating the bottom area and with a conical part connected to said end surface and widening in a direction away from said end surface to form a bottom cup of the container adjacent the bottom area.

4. An apparatus according to claim 1 wherein
   said second calibrating mandrel comprises a conical part on said mandrel end of said second calibrating mandrel and connected to an end surface of said second calibrating mandrel, said end surface of said second calibrating mandrel calibrating the bottom area, said conical part widening in a direction away from said end surface of said second calibrating mandrel to form an outward widening, skirt-shaped spout of the container.

5. An apparatus according to claim 1 wherein
   two pairs of said first and second calibrating mandrels are movable in parallel to one another for forming two containers in said mold components, said second calibrating mandrels of each pair being mounted on a base body with a mandrel drive coupled thereto for moving said base body with said second calibrating mandrel.

6. An apparatus according to claim 1 wherein
   said top and bottom mold components are movable transversely relative to the longitudinal axis of the container between the open and closed positions thereof.

7. An apparatus for producing a container of thermoplastic material, comprising:
   a mold with mold components movable relative to one another between an open position and a closed position and in which synthetic plastic material can be placed against walls of said mold components by a pressure gradient to act on the plastic material and to form a container;
   first and second calibrating mandrels movable coaxially relative to a longitudinal axis of the container and to one another, said first calibrating mandrel being movable through the container located and formed in said mold components, said second calibrating mandrel being movable from outside the container located and formed in said mold components into a shaping position to calibrate a bottom area forming at least part of a container bottom of that container between adjacent mandrel ends of said first and second calibrating mandrels;
   a severing device having a movable cutting surface severing excess plastic material, said cutting surface interacting with a cutting edge on a bottom portion of said mold components, said severing device having a cutting device guided on and axially displaceable on said second calibrating mandrel and forming said cutting surface, said cutting device being movable between a retracted position and a punching position independently of movement of said second calibrating mandrel, said cutting surface being inclined at an acute angle relative to said longitudinal axis, said cutting device having a cutting sleeve guided for displacement on said calibrating mandrel and having said cutting surface on a front edge of said cutting device; and
   separately actuatable first and second drive devices coupled to and moving said second calibrating mandrel back and forward between retracted and shaping positions thereof and coupled to and moving said cutting sleeve between the retracted and punching positions, respectively.

8. An apparatus for producing a container of thermoplastic material, comprising:
   a mold with mold components movable relative to one another between an open position and a closed position and in which synthetic plastic material can be placed against walls of said mold components by a pressure gradient to act on the plastic material and to form a container;
   first and second calibrating mandrels movable coaxially relative to a longitudinal axis of the container and to one another, said first calibrating mandrel being movable through the container located and formed in said mold components, said second calibrating mandrel being movable from outside the container located and formed in said mold components into a shaping position to calibrate a bottom area forming at least part of a container bottom of that container between adjacent mandrel ends of said first and second calibrating mandrels, two pairs of said first and second calibrating mandrels being movable in parallel to one another for forming two containers in said mold components, said second calibrating mandrels of each pair being mounted on a base body with a mandrel drive coupled thereto for moving said base body with said second calibrating mandrel;
   a severing device having a movable cutting surface severing excess plastic material, said cutting surface interacting with a cutting edge on a bottom portion of said mold components, said severing device having a cutting device guided on and axially displaceable on said second calibrating mandrel and forming said cutting surface, said cutting device being movable between a retracted position and a punching position independently of movement of said second calibrating mandrel, said cutting surface being inclined at an acute angle relative to said longitudinal axis; and
   said second calibrating mandrels penetrating support plate and having cutting sleeves of said severing device mounted on said support plate and about said second calibrating mandrels, said support plate being movable with said cutting sleeves relative to said second calibrating mandrels and said base body by a punch drive coupled to said support plate between retracted and punching positions of said cutting sleeves.

9. An apparatus according to claim 8 wherein
   said punch drive comprises at least one working cylinder fitted between said base body and said support plate and actuated by a pressure medium to move said support plate relative to said base body.

10. An apparatus according to claim 8 wherein
    said support plate comprises at least one ejector pin extending parallel to one of said cutting sleeves for ejector activity in connection with a severing process.

11. An apparatus for producing a container of thermoplastic material, comprising:
    a mold with mold components movable relative to one another between an open position and a closed position and in which synthetic plastic material can be placed against walls of said mold components by a pressure gradient to act on the plastic material and to form a container;
    first and second calibrating mandrels movable coaxially relative to a longitudinal axis of the container and to one another, said first calibrating mandrel being movable through the container located and formed in said mold components, said second calibrating mandrel being fixedly mounted on a base body and being movable from outside the container located and formed in said mold components into a shaping position to calibrate a bottom area forming at least part of a container bottom of that container between adjacent mandrel ends of said first and second calibrating mandrels;
    a base drive device coupled to said base body and driving said base body to move said second calibrating mandrel toward and away from the shaping position;
    a severing sleeve having a movable cutting surface severing excess plastic material, said cutting surface interacting with a cutting edge on a bottom portion of said mold components, said severing sleeve being guided on and axially displaceable on said second calibrating mandrel between a retracted position and a punching position independently of movement of said second calibrating mandrel;
    a support plate being penetrated by said second calibrating mandrel, fixedly mounting said severing sleeve thereon and being movable relative to said base body; and
    a punch drive mounted between and coupled to said base body and said support plate to drive said support plate toward and away from said base body.

12. An apparatus according to claim 11 wherein
    said cutting surface is inclined at an acute angle relative to said longitudinal axis.

13. An apparatus according to claim 11 wherein
    said cutting surface is on a front edge of said cutting device.

14. An apparatus according to claim 11 wherein
    said first calibrating mandrel comprises a molded body with an end surface on said mandrel end of said first calibrating mandrel for calibrating the bottom area and with a conical part connected to said end surface and widening in a direction away from said end surface to form a bottom cup of the container adjacent the bottom area.

15. An apparatus according to claim 11 wherein
    said second calibrating mandrel comprises a conical part on said mandrel end of said second calibrating mandrel and connected to an end surface of said second calibrating mandrel, said end surface of said second calibrating mandrel calibrating the bottom area, said conical part widening in a direction away from said end surface of said second calibrating mandrel to form an outward widening, skirt-shaped spout of the container.

16. An apparatus according to claim 11 wherein
    said punch drive comprises at least one working cylinder fitted between said base body and said support plate and actuated by a pressure medium to move said support plate relative to said base body.

17. An apparatus according to claim 11 wherein
    said support plate comprises at least one ejector pin extending parallel to said severing sleeve for ejector activity in connection with a severing process.

18. An apparatus according to claim 11 wherein
    said top and bottom mold components are movable transversely relative to the longitudinal axis of the container between the open and closed positions thereof.

* * * * *